United States Patent [19]
Niino et al.

[11] 3,893,974
[45] July 8, 1975

[54] EPOXY RESIN COMPOSITIONS CONTAINING AMINIMIDE COMPOUND

[75] Inventors: Hideki Niino; Yo Marayama, both of Yokohama, Japan

[73] Assignee: Permachem Asia Co. Ltd., Tokyo, Japan

[22] Filed: Oct. 2, 1973

[21] Appl. No.: 402,839

Related U.S. Application Data

[63] Continuation-in-part of Ser. No. 236,348, March 20, 1972, abandoned.

[30] Foreign Application Priority Data

Apr. 20, 1971 Japan.............................. 46-24982
July 1, 1971 Japan.............................. 46-47637

[52] U.S. Cl........ 260/47 EN; 117/132 BE; 260/2 N; 260/2 EC; 260/28; 260/30.4 EP; 260/30.6 R; 260/31.8 E; 260/33.6 EP; 260/37 EP; 260/47 EC; 260/59
[51] Int. Cl............................................ C08g 30/14
[58] Field of Search. 260/47 EN, 2 N, 2 EC, 47 EC, 260/59

[56] References Cited
UNITED STATES PATENTS
3,371,097   2/1968   Cyba................................... 260/2 N
3,628,992   12/1971  McKillip........................... 117/76 A

OTHER PUBLICATIONS
Journal of Polymer Science, Part A-1, Vol. 6, (p. 2197-2207), (1968).

*Primary Examiner*—Morris Liebman
*Assistant Examiner*—T. Pertilla
*Attorney, Agent, or Firm*—Sherman & Shalloway

[57] ABSTRACT

Epoxy resin compositions of excellent hardening property are prepared consisting essentially of a 1,2-epoxy resin and 0.002 to 8 parts by weight of an aminimide compound of the formula,

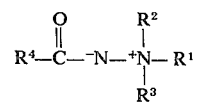

in which $R^1$ represents an alkyl radical or a residue,

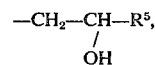

$R^2$ and $R^3$ represent alkyl radicals, $R^4$ represents an optionally substituted alkyl, aryl, aralkyl, cycloalkyl, alkoxy or allyloxy radical, or a vinyl radical,
isopropenyl radical or a residue.

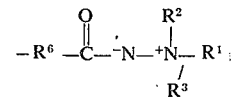

$R^5$ represents a hydrogen atom, or an alkyl, aryl, alkoxymethyl, aryloxymethyl, allyloxymethyl, hydroxyalkyl, methacryloyloxymethyl, or acryloyloxymethyl radical, and $R^6$ represents an aliphatic, alicyclic, or aromatic hydrocarbon residue, per 100 parts by weight of said epoxy resin.

22 Claims, No Drawings

EPOXY RESIN COMPOSITIONS CONTAINING AMINIMIDE COMPOUND

This application is a continuation-in-part of our co-pending application Ser. No. 236,348 which was filed March 20, 1972, now abandoned.

This invention relates to epoxy resin compositions of excellent hardening property and storage stability.

Various amine compounds are known as quick-acting hardeners for epoxy resins. Also, dicyandiamide, boron trifluoride-amine complex, amine salts, and amine boride complex are known, for example, as latent hardeners. An example of the amine salt conventionally used for this purpose is tridimethylaminomethylphenol-tri-2-ethyl hexonate, which initiates an esterification reaction with epoxy groups at room temperature, causing such drawbacks as short and irregular pot life. Amine complexes of boron trifluoride and complexes of boron release free $BF_3$ which is metal-corrosive, and also have the further drawbacks that they are hygroscopic, and occasionally start an unexpected hardening reaction which is difficult to control.

Generally the properties required of satisfactory hardeners and resins compositions containing them are as follows:
1. That they have long pot life;
2. That their hardening is not very exothermic;
3. That their shrinkage at hardening is minor;
4. That they are not volatile or sublimating;
5. That their hygroscopicity is low;
6. That they are non-toxic (not skin-irritating);
7. That they show no corroding action against metal, such as copper; and
8. That they have good physical and electrical properties.

The present invention provides resinous compositions containing a latent hardening accelerator which satisfies all of the foregoing requirements. More particularly, the invention provides epoxy resin compositions of excellent hardenability which consist essentially of epoxy resin and, as the hardener of the epoxy resin, 0.002 to 8 parts by weight of an aminimide compound of the formula,

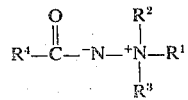

in which
R¹ represents an alkyl or a residue,

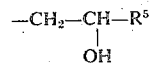

R² and R³ represent alkyl radicals,
R⁴ is an optionally substituted alkyl, aryl, aralkyl, cycloalkyl, alkoxy or allyloxy radical or a vinyl radical, isopropenyl radical or a residue,

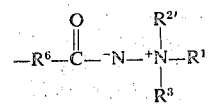

R⁵ is hydrogen atom, or an alkyl, aryl, alkoxymethyl, aryloxymethyl, allyloxymethyl, hydroxyalkyl, methacryloyloxymethyl, or acryloyloxymethyl radical, and R⁶ represents an aliphatic, alicyclic, or aromatic hydrocarbon residue, per 100 parts by weight of said epoxy resin.

In the present specification and appended Claims, the term "epoxy resin" is used to define a polyepoxide containing, on the average, at least one epoxy group per molecule.

Examples of the epoxy resins useful for the subject compositions include the following: epoxy resins obtained from an epoxy novolak such as polyorthocresolformaldehyde-poly(2,3-epoxypropyl) ether, polyphenylformaldehyde-poly(2,3-polypropyl) ether, etc., or bisphenol A, or acetone condensate of resorcinal, and epichlorohydrin; epoxidated polyolefin resins; and epoxy resins obtained from phenolphthalein and epichlorohydrin. Among the foregoing, liquid polyglycidyls are advantageously used, a liquid polyglycidyl ether of 2,2-bis-(4-hydroxyphenyl)-propane being particularly preferred. The polyepoxide may contain minor quantities of a liquid monoepoxide, such as butyl glycidyl ether, phenyl glycidyl ether, octyl glycidyl ether, and glycidyl ester of monocarboxylic acid. Those monoepoxided serve as reactive diluents, which are concurrently used with viscous liquid polyepoxides for advantageously reducing the viscosity of the system.

Examples of the aminimide compounds of the foregoing general formula to be employed in this invention include the following:

1,1-Dimethyl-1-(2'-phenyl-2'-hydroxyethyl)-aminemethacrylimide,
1,1-Dimethyl-2-(2'-hydroxy-3'-phenoxypropyl)-aminemethacrylimide,
1,1-Dimethyl-1-(2'-hydroxy-3'-butoxypropyl)-aminemethacrylimide,
1,1-Dimethyl-1-(2'-hydroxy-3'-allyloxypropyl)-aminemethacrylimide,
1,1-Dimethyl-1-(2'-hydroxy-3'-methacryloyloxypropyl)-aminemethacrylimide,
1,1-Dimethyl-1-(2'-hydrocypropyl)-aminemethacrylimide,
1,1-Dimethyl-1-(2',3'-dihydroxypropyl)-aminemethacrylimide,
1,1,1Trimethylamineacrylimide,
1,1-Dimethyl-(2'-hydropropyl)-aminearylimide,
1,1-Dimethyl-1-(2'-hydroxy-2'-phenylethyl)-aminemethacrylimide,
1,1-Dimethyl-1-(2'-hydroxypropyl)-aminepropionimide,
1,1-Dimethyl-1-(2'-hydroxypropyl)-amineaurinimide,
1,1-Dimethyl-1-(2'-hydroxyoctyl)-amineaurinimide,
1,1-Dimethyl-1-(2'-hydroxypropyl)-aminetrifluoroacetimide,
1,1-Dimethyl-1-(2'-hydroxypropyl)-amineperfluoropropionimide,
1,1-Dimethyl-1-(2'-hydroxypropyl)-aminebenzimide,
1,1-Dimethyl-1-(2'-hydroxy-2'-phenylethyl)-aminebenzimide,
1,1-Dimethyl-1-(2'-hydroxyethyl)-aminebenzimide,
1,1-Dimethyl-1-(2',3'-dihydroxypropyl)-aminebenzimide, 1,1-Dimethyl-1-(2'-hydroxy-3'-phenoxypropyl)-aminebenzimide,
1,1-Dimethyl-1-(2'-hydroxy-3'-methacryloyloxypropyl)-aminebenzimide,
1,1-Dimethyl-1-(2'-hydroxy-2'-phenylethyl)-aminebenzimide,
1,1-Dimethyl-1-(2'-hydroxy-3'-acryloyloxypropyl)-aminebenzimide,
1,1-Dimethyl-1-(2'-hydroxy-3'-butoxypropyl)-aminebenzimide,
1,1-Dimethyl-1-(2'-hydroxy-3'-butoxypropyl)-aminepropionimide,
Bis-trimethylaminesebacinimide,
Bis-trimethylamineazelainimide,
Bis-trimethylamineadipinimide,
Bis-trimethylaminemaleinimide,
Bis-trimethylaminecyclobutane-1,2-dicarbimide,
Bis-trimethylamineisophthalimide,
Bis-triethylaminemalonimide,
Bis-tributylamineadipinimide,
Bis-dimethylethylamineadipinimide,
Bis-trimethylaminenaphthalene-1,5-dicarbimide,
Bis-1,1-dimethyl-1-(2'-hydroxypropylamine) adiphthalimide,
Bis-1,1-dimethyl-1-(2'-hydroxypropylamine) phthalimide,
1,1,1-Trimethylaminemethacrylimide,
1,1,1-Trimethylaminebenzimide,
1,1,1-Trimethylamine-4-styrenecarbimide,
1,1,1-Trimethylamine-adamantanecarbimide,
1,1,1-Trimethylamine-phenyloxycarbimide,
1,1,1-Trimethylamine-ethoxycarbimide,
1,1,1-Trimethylamine-phenylthiocarbimide,
1,1-Dimethyl-1-(2'-hydroxypropyl)-aminemonochloroacetimide,
1,1-Dimethyl-1-(2'-hydroxypropyl)-aminelactimide,
1,1-Dimethyl-1-(2'-hydroxypropyl)-aminetaluimide,
1,1Dimethyl-1-(2'-hydroxypropyl)-aminehydroxybenzimide,
1,1-Dimethyl-1-(2'-hydroxypropyl)-amine-p-methoxybenzimide,
1,1-Dimethyl-1-(2'-hydroxypropyl)-amine-o-chlorobenzimide,
1,1-Dimethyl-1-(2'-hydroxypropyl)-amine-m-nitrobenzimide, and
1,1-Dimethyl-1-(2'-hydroxypropyl)-aminephenylacetimide.

The aminimide compounds useful for the present invention can be obtained either by reacting an asymmetric alkylhydrazine with an epoxy compound and a carboxylic acid ester in a solvent, such as alcohol, or by quaternarizing an asymmetric alkylhydrazide of a carboxylic acid with an alkyl halide, and then dehydrohalogenating the same with a base. After either of the above reactions, the solvent and unreacted compounds are distilled off from the reaction mixture under reduced pressure.

The above reactions can be respectively expressed by the formulae below:

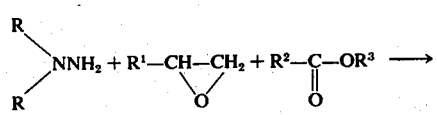

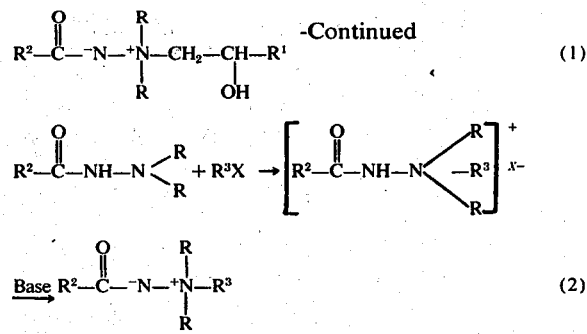

The details of the above processes for the preparation of aminimide compounds are disclosed in the following literature references:
A. J. Org. Chem. 33 1374 (1968)
B. Japanese Official Patent Gazette, Publication No. 9367/70
C. Canadian J. Chem. 45 2619 (1967)
D. J. Polymer Sci.: Part A-I 6 2197 (1968)
E. J. Chem. Eng. Data 12 612 (1967)

The content of aminimide compounds contained in the composition of this invention ranges from 0.002 to 8 parts by weight or preferably 0.1 to 6 parts by weight per 100 parts by weight of the epoxy resin. The composition of this invention may contain an aminimide compound alone as a hardening agent for the epoxy resin, or may also be formed into two-part epoxy resins by employing as the hardener a polycarboxylic anhydride and an aminimide compound.

Where an aminimide compound alone is used as the hardener, the aminimide compound may be used in amount of 1–8 parts by weight, or preferably 3–6 parts by weight per 100 parts by weight of epoxy resin. When being used together with a polycarboxylic acid anhydride, the amount of aminimide may be reduced to 0.002 to 5 parts by weight, preferably 0.1 to 1 part by weight, or more preferably to 0.1 to 0.3 part by weight per 100 parts by weight of the epoxy resin.

When the content of aminimide compound exceeds 8 parts by weight, the pot life of the composition is shortened and the mechanical rigidity of the hardened resin is reduced. When the aminimide compound content is less than 0.002 part by weight, hardening time will be extended.

Examples of the polycarboxylic anhydride are as follows: tetrahydrophthalic anhydride, hexahydrophthalic anhydride, maleic anhydride, itaconic anhydride, citraconic anhydride, succinic anhydride, dichlorosuccinic anhydride, 3,4,5,6,7,7-hexachloro-3,6-endomethylene-1,2-tetrahydrophthalic anhydride (chlorendic anhydride), dodecylsuccinic anhydride, dodecenylsuccinic anhydride, 3,6-endomethylenetetrahydrophthalic anhydride, methyl-3,6-endomethylenetetrahydrophthalic anhydride, methylbicyclo[2.2.1]heptene-2,3-dicarboxylic anhydride isomers, trimellitic anhydride, polyazelaic anhydride, pyromellitic dianhydride, benzophenone-3,4,3',4'-tetracarboxylic acid, partial esters of glycols and of glycerol with trimellitic anhydride, and mixtures of the foregoing. Those polycarboxylic acid anhydrides are well known as hardeners of epoxy resin.

The equivalent ratio of the polycarboxylic acid anhydride to the polyepoxide in the two-part epoxy resins of this invention is preferably within the range of 0.6:1 to 1.2:1, while that of the dicarboxylic acid anhydride is approximately 1:1. If a chlorinated polycarboxylic acid is used, the preferred range is approximately 0.6:1.

The epoxy resin compositions of the invention may further contain a solvent or diluent such as xylene, dibutyl phthalate, tricresyl phosphate, phenyl glycidyl ether, butyl glycidyl ether, styrene oxide, and allyl glycidyl ether; fillers such as finely divided minerals, e.g., glass fiber, asbestos, sand, etc.; pigments; softening agents; other resins; asphalt; tar; stabilizers; insecticides, dyestuffs; plasticizers; and other conventionally employed additives.

The hardener employed in accordance with the invention imparts high strength to the hardened resin. Furthermore, the hardener is stable at room temperature, is non-volatile, and has no objectionable odor and little toxicity. Thus the hardener is very convenient for handling, compared with conventionally employed amines.

The resinous compositions of the invention have long pot life, can be stored for prolonged periods as the blend of epoxy resin and hardener, and show equally favorable performance after a long period of storage. Thus the compositions are suitable as one part epoxy resins.

The hardening of the compositions of this invention is effected by heating the components to temperatures higher than room temperature, normally ranging from 80° to 200°C. While foregoing temperature range is suitable for many purposes, temperature higher than 200°C. may be employed if so desired.

The epoxy resin compositions of this invention have important utilities in various fields. For example, they can be used as adhesives, paints, coating materials, electrically insulative materials, laminates, and construction materials.

Hereinafter the invention will be explained in further detail with reference to working Examples, which are given strictly for illustrative purpose, and are in no way limitative of the scope of this invention.

In the Examples, parts are by weight, unless otherwise specified.

EXAMPLE 1 a. To 100 parts of "Epikote 828" (trademark for diglycidyl ether epoxy resin of bisphenol A, product of Shell International Chemicals Corp., epoxy equivalent: approximately 190), 6 parts of 1,1-dimethyl-1-(2'-hydroxypropyl)-aminemethacrylimide of the formula.

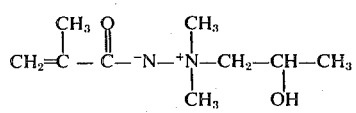

were added and thoroughly mixed to provide a resinous composition. The composition was used to adhere two aluminum sheets each of 2 mm in thickness, 1 cm in width, and 7.5 cm in length, and the adhering strength was measured. The tensile shearing test was performed in accordance with ASTM D-1002-53T, and friction-pull test, ASTM D-903-49, using an Instron universal tester, TOM-5000. The resinous composition used for the adhesion was hardened by heating the same at 155°C. for 5 hours, in a hot air current dryer. The tensile shearing strength was 170 – 180 kg/cm². When the same composition was used to adhere two iron sheets of the same size as above, in identical manner, the tensile shearing strength measured by an identical test was 212 kg/cm².

b. Separately, 8 parts of the same aminimide compound used above were added to 100 parts of Epikote 828 and mixed thoroughly. The resinous composition obtained was used to adhere two aluminum sheets each of 2 mm in thickness, 2.54 cm in width, and 30.48 cm in length, and its the T-peeling strength was measured. The hardening was effected at 155°C. for 3 hours, and 5 hours. In the former case the peeling strength was 24.1 kg/25 mm, and in the latter case, 32.8 kg/25 mm.

In the foregoing tests, the aluminum sheets used as the test specimens were preliminarily treated with a liquid mixture of phosphoric acid, n-butanol, isopropanol and water at the quantitative ratio of 1:4:3:2, for ten minutes at room temperature, washed with water and then with acetone, and air-dried.

The iron sheets were preliminarily degreased with acetone, polished with sand paper, again washed with acetone, and air-dried.

The pot life of the resinous compositions employed in this Example was in all cases over one month in an incubator (40°C.).

The hardening agent employed in this Example, 1,1-dimethyl-1-(2'-hydroxypropyl)-aminemethacrylimide, showed very low toxicity, its $LD_{50}$ (mouse) being not less than 6.06 g/kg. No skin irritation was observed during the patch test.

Control 1

A resin composition was prepared in the same manner as in Example 1 (a) using 10 parts, instead of 6 parts, of aminimide compound, to bond the two aluminum plates under the same conditions as those of Example 1 (a). Tensile shearing strength was measured to be 109 Kg/cm². The pot life was 30 days as measured under the same condition as in Example 1.

EXAMPLE 2

To 100 parts of Epikote 828, 6 parts of 1,1-dimethyl-1-(2,3-dihydroxypropyl)-aminemethacrylimide of the formula,

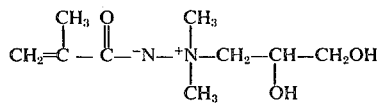

were added, and mixed thoroughly. The resinous composition obtained was used to adhere aluminum sheets and iron sheets in a manner identical with Example 1. The hardening condition was at 185°C. for 5 hours. The Al-Al tensile shearing strength was 190 – 200 kg/cm², and Fe-Fe tensile shearing strength was 244 kg/cm². The composition had a pot life of over one month in an incubator (40°C.).

EXAMPLE 3

To 100 parts of Epikote 828, 6 parts of 1,1-dimethyl-1-(2-hydroxy-2-phenylethyl)-aminemethacrylimide (white crystal, m.p. = 82° – 83°C.) of the formula

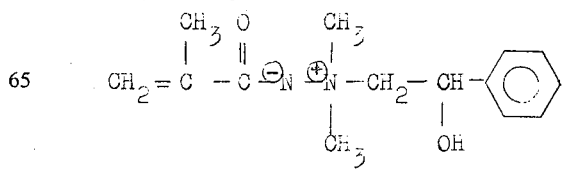

were added and mixed thoroughly. The resulting resinous composition was tested to determine its adhering strength to Al-Al and Fe-Fe, similarly to Example 1. The hardening condition was at 155°C. for 5 hours. The Al-Al tensile shearing strength was 170 – 180 kg/cm², and Fe-Fe tensile shearing strength was 234 kg/cm². The pot life of the composition was over one month in an incubator (40°C.).

EXAMPLE 4

To 100 parts of Epikote 828, 6 parts of 1,1-dimethyl-1-(2-hydroxy-3-allyloxypropyl)-aminemethacrylimide (white crystal, m.p. = 72°C.) of the formula

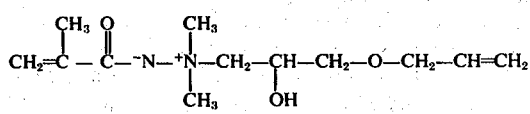

were added and mixed thoroughly. The adhering strength of the resulting resinous composition was tested as to Al-Al and Fe-Fe similarly to Example 1. The hardening condition was at 130°C. for 5 hours. The Al-Al tensile shearing strength was 190 kg/cm², and Fe-Fe tensile shearing strength was 230 kg/cm².

When the hardening condition was set at 170°C. for 1.5 hours, the Al-Al tensile shearing strength was 180 kg/cm².

The T-peeling strength of the resinous composition was measured in the manner identical with the friction-pull test given in Example 1. The strength of the composition hardened by 3 hours heating was 17.6 kg/25 mm, and that after 5 hours heating was 38.7 kg/25 mm.

The pot life measured under the same conditions as in Example 1 was over 30 days.

The resinous compositions prepared similarly to the above, except that the hardener was replaced in each run, respectively by 1,1,1-trimethylaminemethacrylimide, 1,1-dimethyl-1-(2-hydroxy-3-n-butyloxypropyl)-aminemethacrylimide (white crystal, m.p. = 50°C.) 1,-1-dimethyl-1-(2-hydroxy-3-phenyloxypropyl)-aminemethacrylimide (white crystal, m.p. = 92°C.), 1,-1-dimethyl-1-(2-hydroxyethyl)-aminemethacrylimide (m.p. = 80°C.) and 1,1,1-trimethylamineacrylimide (m.p. = 87°C.), showed excellent adhering strength in all cases.

Control 2

To 100 parts of Epikote 828, 5 parts of commercial $BF_3 \cdot MEA$ (monoethylamine salt of boron trifluoride) were added, and the resinous composition was heated at 130°C. for 2 hours, and that at 150°C. for 2 hours. The adhering strength of the composition measured similarly to Example 1 was, as to Al-Al tensile shearing strength, 51 kg/cm², and as to Fe-Fe tensile shearing strength, 57 kg/cm².

Control 3

To 100 parts of Epikote 828, 2 parts of Epicure Z (trademark for an aromatic amine type modified hardener, product of Shell International Chemicals, Corp.) were added, and the resulting resinous composition was heat-treated at 170°C. for 4 hours. The tensile shearing strength of the resin measured similarly to Example 1 as to Al-Al was 115 kg/cm². Also its T-peeling strength was 17.7 kg/25 mm after 3 hours heat-treatment similar to that of Example 1, and 7.6 kg/25 mm after 5 hours heat-treatment.

Control 4

Three compositions were prepared in the same manner as in Example 4 but using — instead of 6 parts — 10 parts, 30 parts and 50 parts of 1,1-dimethyl-1-(2-hydroxy-3-allyloxypropyl)-aminemethacrylamide, respectively. The Al-Al tensile shearing strength and pot life were measured under the same conditions as in Example 4. Results obtained were as listed in Table 1 below. Table 1 contains Al-Al tensile shearing strength and pot life of Example 4.

Table 1

| | Amount of aminimide compound added (phr) | Hardening condition Temperature (°C.) | Time (hr) | Tensile shearing strength (kg/cm²) | Pot life (day) |
|---|---|---|---|---|---|
| Example 4 | 6 | 130 | 5 | 190 | >30 |
| " | 6 | 170 | 1.5 | 180 | |
| Control 4 | 10 | 130 | 5 | 140 | 10 |
| " | 10 | 170 | 1.5 | 110 | |
| " | 30 | 130 | 5 | 121 | 4 |
| " | 30 | 170 | 1.5 | 38 | |
| " | 50 | 130 | 5 | — | <1 |

EXAMPLE 5

To 100 parts of Epikote 828, 6 parts of bis-[1,1-dimethyl-1-(2'-hydroxypropyl)-amine]-adipinimide were added, and mixed throughly to provide a resinous composition. The composition had a pot life of over one month in an incubator (40°C.).

Immediately after the preparation, the composition was used to adhere two aluminum sheets of 2 mm in thickness, 1 cm in width, and 8.5 cm in length, and hardened in a hot air-current dryer at 185°C. for 5 hours. Thereafter its tensile shearing strength was measured similarly to Example 1, with the result being 190 kg/cm².

The same epoxy resin composition was stored in an incubator (40°C.) for one month, and its adhering strength tested similarly to the above. The Al-Al tensile shearing strength was 186 kg/cm², showing little deterioration in the compositions' performance.

Control 5

A resin composition was prepared in the same manner as in Example 5 but using 10 parts, instead of 6 parts, of aminimide compound. Immediately after the preparation of the resin composition, its Al-Al tensile shearing strength was measured to be 119.8 kg/cm² under the same conditions as in Example 5. The pot life of the resin composition was 30 days as measured under the same conditions as in Example 5.

EXAMPLE 6

To 100 parts of Epikote 828, 6 parts of 1,1-dimethyl-1-(2'-hydroxypropyl)-aminepropylimide were added to provide an epoxy resin composition. The composition had a pot life of over 1 month, when stored in an incubator (40°C.). The composition was used to adhere two aluminum sheets similarly to Example 5 before and after the storage. The tensile shearing strength of the composition before storage, after 5 hours hardening at 180°C. was 144 kg/cm², and after the storage and identical hardening 139 kg/cm².

EXAMPLE 7

To 100 parts of Epikote 828, 8 parts of 1,1-dimethyl-1-(2'-hydroxypropyl)-aminebenzimide were added to provide a resinous composition which had a pot life of over 1 month when stored in an incubator (40°C.). The adhering strength of the composition before and after the storage was measured similarly to Example 5, in both cases after 5 hours hardening at 185°C. The Al-Al tensile shearing strength of the composition was 166 kg/cm² before the storage, and 167 kg/cm² after the storage.

EXAMPLE 8

To 100 parts of Epikote 828, 8 parts of bis-(trimethylamine)-phthalimide were added to provide a composition which had a pot life of over one month when stored in an incubator (40°C.). The adhering strength of the composition before and after the storage was measured in the manner similar to Example 5, after 7 hours hardening at 185°C. The tensile shearing strength was, before the storage, 109 kg/cm², and after the storage, 102 kg/cm².

For comparison, 5 parts of commercial BF$_3$·MEA (monoethylamine salt) were added to 100 parts of Epikote 828, and the composition adhering strength at Al-Al was similarly tested. After 2 hours hardening at 130°C. and further 2 hours hardening at 150°C., the tensile shearing strength was 51 kg/cm².

EXAMPLES 9 – 12

To each 100 parts of Epikote 828, 5 parts of the hardener specified in the Table 2 below were added to form resinous compositions, and their adhering strength as to Al-Al was tested immediately after the preparation and after 1 month storage in an incubator (40°C.), in the manner similar to Example 5. The results were as shown in the same table. All the composition had a pot life of over 1 month when stored in an incubator (40°C.), showing substantially no deterioration in performance after the storage period.

Table 2

| Ex. No. | Hardener | Before Storage | | | After storage (40°C. One Month) | | |
|---|---|---|---|---|---|---|---|
| | | Hardening Temp. (°C.) | Treating Time (hrs.) | Strength (kg/cm²) | Hardening Temp. (°C.) | Treating Time (hrs.) | Strength (kg/cm²) |
| 9 | 1,1-Dimethyl-1-(2'-hydroxy-3'-phenoxypropyl)-aminebenzimide | 130<br>155<br>180 | 5<br>5<br>3 | 182<br>220<br>183 | 155 | 5 | 213 |
| 10 | 1,1-Dimethyl-1-(2'-hydroxy-2'-phenylethyl)-aminebenzimide | 130<br>155<br>180 | 5<br>5<br>3 | 179<br>195<br>206 | 180 | 3 | 204 |
| 11 | 1,1-Dimethyl-1-(2'-hydroxy-2'-allyloxypropyl)-aminebenzimide | 130<br>155<br>180 | 3<br>3<br>3 | 170<br>228<br>250 | 180 | 3 | 251 |
| 12 | 1,1-Dimethyl-1-(2'-hydroxy-2'-butoxypropyl)-aminebenzimide | 155<br>180 | 3<br>3 | 178<br>216 | 180 | 3 | 220 |

EXAMPLES 13 – 16

To each 100 parts of Epikote 828, 5 parts of the hardener specified in Table 2 were added to form epoxy resin compositions. They were used to adhere two aluminum sheets similarly to Example 5, immediately after the preparation and after 1 month storage in an incubator (40°C.), and their tensile shearing strength was measured. The results were as shown also in Table 3. All the compositions had a pot life of over 1 month, when stored in an incubator (40°C.).

Table 3

| Ex. No. | Hardener | Before Storage | | | After Storage | | |
|---|---|---|---|---|---|---|---|
| | | Hardening Temp. (°C.) | Treating Time (hrs.) | Strength (kg/cm²) | Hardening Temp. (°C.) | Treating Time (hrs.) | Strength (kg/cm²) |
| 13 | 1,1-Dimethyl-1-(2'-hydroxy-3'-phenoxypropyl)-aminepropionimide | 130<br>155<br>180 | 5<br>3<br>3 | 215<br>241<br>233 | 155 | 3 | 238 |
| 14 | 1,1-Dimethyl-1-(2'-hydroxy-2'-phenylethyl)-aminepropionimide | 130<br>155<br>180 | 5<br>5<br>3 | 207<br>260<br>147 | 155 | 5 | 249 |
| 15 | 1,1-Dimethyl-1-(2'-hydroxy-3'-allyloxypropyl)-aminepropionimide | 130<br>155<br>180 | 5<br>3<br>1.5 | 230<br>254<br>230 | 155 | 3 | 250 |
| 16 | 1,1-Dimethyl-1-(2'-hydroxy-3'-butoxypropyl)-aminepropionimide | 130<br>155<br>180 | 5<br>3<br>3 | 222<br>237<br>245 | 180 | 3 | 244 |

EXAMPLE 17

A specimen was prepared by mixing 80 parts of hexahydrophthalic acid anhydride and aminimide compound of the amount shown in Table 4 below into 100 parts of Epikote 828. The specimen was divided into two parts. One part was measured at 165°C. for its gelling time, and the other one was measured for its usable period at room temperature. Usable period was determined by measuring the change of viscosity with time by keeping the composition at room temperature by means of Gardner-Holdt bubble viscometer. For comparison, the results of using benzyldimethylamine (BDMA) in place of the aminimide compound, and also of using no aminimide compound, are concurrently given in Table 4.

Table 4

| Aminimide Compound | Amount (part) | Gelation Time (min.) | Change of Hardener Viscosity due to Lapse of Time | | | | |
|---|---|---|---|---|---|---|---|
| | | | Initial viscosity | 2 Days | 7 Days | 15 Days | 30 Days |
| 1,1-Dimethyl-1-(2'-hydroxypropyl)-amine-methacrylimide | 0.1 | 23 | W⁻ | W⁻ | W⁻ | W⁻ | W⁻ |
| | 0.2 | 14 | " | " | " | " | " |
| | 0.3 | 8 | " | " | " | " | " |
| | 10.0 | — | V⁻ | Y⁻ | Z–Z₁ | Z₁–Z₅ | Z₁–Z₅ |
| 1,1-Dimethyl-1-(2'-hydroxy-3'-methacryloy-loxypropyl)-aminebenzimide | 0.1 | 52 | W⁻ | W⁻ | W⁻ | W⁻ | W⁻ |
| | 0.2 | 27 | " | " | " | " | " |
| | 0.3 | 16 | " | " | " | " | " |
| 1,1-Dimethyl-1-(2'-hydroxy-3'-methacryloyloxypropyl)-aminepropionimide | 0.1 | 42 | " | " | " | " | " |
| | 0.2 | 18 | " | " | " | " | " |
| | 0.3 | 13 | " | " | " | " | " |
| 1,1-Dimethylamine-1-(2'-hydroxy-3'-methacryloyloxypropyl)-aminemethacrylimide | 0.1 | 37 | " | " | " | " | " |
| | 0.2 | 20 | " | " | " | " | " |
| | 0.3 | 20 | " | " | " | " | " |
| BDMA (Control) | 0.05 | 36 | V⁻ | X–Y | Y | Z–Z₁ | Z₁–Z₅ |
| None | — | 3 hrs. | | | | | |

EXAMPLE 18

100 part specimens of Epikote 828 were mixed with the aminimide compounds specified in Table 5 and in the specified amounts, to form first liquids. Each of the first liquids was then mixed with 80 parts of tetrahydrophthalic anhydride as the second liquid, and the compositions' performance was tested similarly to Example 17. For comparison, the results of the runs in which the aminimide compound was replaced by BDMA and no aminimide compound was added are also given in Table 5 below.

Table 5

| Aminimide Compound | Amount (part) | Gelation Time (min.) |
|---|---|---|
| 1,1,1-Trimethylaminebenzimide | 0.1 | 19 |
| | 0.2 | 8 |
| | 0.3 | 5 |
| 1,1-Dimethyl-1-(2',3'-dihydroxypropyl)-aminemethacrylimide | 0.1 | 24 |
| | 0.2 | 12 |
| | 0.3 | 10 |
| 1,1-Dimethyl-1-(2'-hydroxy-3'-methacryloyloxypropyl)-aminebenzimide | 0.1 | 22 |
| | 0.2 | 14 |
| | 0.3 | 12 |
| 1,1-Dimethyl-1-(2'-hydroxy-3'-methacryloyloxypropyl)-aminepropionimide | 0.1 | 18 |
| | 0.2 | 11 |
| | 0.3 | 9 |
| 1,1-Dimethyl-1-(2'-hydroxypropyl)-aminemethacrylimide | 0.1 | 23 |
| | 0.2 | 8 |
| | 0.3 | 6 |
| 1,1-Dimethyl-1-(2'-hydroxy-3'-methacryloyloxypropyl)-amine-methacrylimide | 0.1 | 20 |
| | 0.2 | 13 |
| | 0.3 | 9 |
| 1,1-Dimethyl-1-(2'-hydroxy-2'-phenylethyl)-aminemethacrylimide | 0.1 | 27 |
| | 0.2 | 17 |
| | 0.3 | 13 |
| Bis-[1,1-dimethyl-1-(2'-hydroxypropyl)-amine]-adipinimide | 0.1 | 17 |
| | 0.2 | 12 |
| | 0.3 | 8 |
| 1,1,1-Trimethylaminemethacrylimide | 0.1 | 14 |
| | 0.2 | 10 |
| | 0.3 | 8 |
| Bis-(1,1,1-trimethylamine)-terephthalimide | 0.1 | 22 |
| | 0.2 | 18 |
| | 0.3 | 10 |
| BDMA | 0.05 | 38 |

EXAMPLE 19

To a mixture of 100 parts of Epikote 828 with 80 parts of tetrahydrophthalic anhydride, 0.2 part of an aminimide compound was added as an accelerator, and mixed thoroughly. The specific aminimide compound in each run is identified in Table 6 below. The compositions obtained were tested with respect to their adhering strength similarly to Example 1, by using each of them to adhere two aluminum sheets of 2 mm in thickness, 1 cm in width and 8.5 cm in length, with the results as shown also in Table 6.

Table 6

| Aminimide Compound | Hardening Temp. (°C.) | Hardening Time (hrs.) | Adhering Strength (kg/cm²) |
|---|---|---|---|
| 1,1,1-Trimethylamine-benzimide | 160 | 1.5 | 147.5 |
| | | 2.0 | 147.5 |
| 1,1-Dimethyl-1-(2'-hydroxypropyl)-amine-benzimide | " | 1.5 | 116.0 |
| | | 2.0 | 123.0 |
| 1,1-Dimethyl-1-(2',3'-dihydroxypropyl)-amine-methacrylimide | " | 1.5 | 72.0 |
| | | 2.0 | 173.0 |
| 1,1-Dimethyl-1-(2'-hydroxy-3'-methacryloyloxypropyl)-aminemethacrylimide | " | 1.5 | 115.0 |
| | | 2.0 | 160.0 |
| 1,1-Dimethyl-1-(2'-hydroxypropyl)-aminemethacrylimide | " | 1.5 | 119.0 |
| | | 2.0 | 160.0 |
| 1,1,1-Trimethylamine-methacrylimide | " | 1.5 | 155.0 |
| | | 2.0 | 162.5 |
| Bis-[1,1-dimethyl-1-(2'-hydroxypropyl)-amine]adipinimide | " | 1.5 | 161.0 |
| | | 2.0 | 167.0 |
| None | " | 1.5 | 33.0 |
| | | 2.0 | 133.0 |

What we claim is:

1. Epoxy resin composition of excellent hardening property consisting essentially of a 1,2-polyepoxy resin and 0.002 to 8 parts by weight of an aminimide compound of the formula,

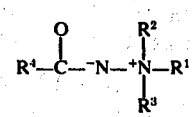

in which R¹ represents an alkyl radical or a residue,

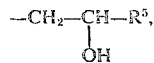

R² and R³ represent alkyl radicals,
R⁴ represents an optionally substituted alkyl, aryl, aralkyl, cycloalkyl, alkoxy or allyloxy radical, or a vinyl radical, isopropenyl radical or a residue,

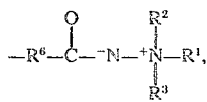

R⁵ represents a hydrogen atom, or an alkyl, aryl, alkoxymethyl, aryloxymethyl, allyloxymethyl, hydroxyalkyl, methacryloyloxymethyl, or acryloyloxymethyl radical, and
R⁶ represents an aliphatic, alicyclic, or aromatic hydrocarbon residue,
per 100 parts by weight of said epoxy resin.

2. The composition of claim 1, wherein R² and R³ are methyl radicals.

3. The composition of claim 2, wherein the aminimide compound is 1,1-dimethyl-1-(2'-hydroxypropyl)-aminemethacrylimide.

4. The composition of claim 2, wherein the aminimide compound is 1,1-dimethyl-1-(2,3-dihydroxypropyl)-aminemethacrylimide.

5. The composition of claim 2, wherein the aminimide compound is 1,1-dimethyl-1-(2'-hydroxy-2'-phenylethyl)-aminemethacrylimide.

6. The composition of claim 2, wherein the aminimide compound is 1,1-dimethyl-1-(2'-hydroxy-3'-allyloxypropyl)-aminemethacrylimide.

7. The composition of claim 2, wherein the aminimide compound is 1,1-dimethyl-1-(2'-hydroxy-3'-n-butyloxypropyl)-aminemethacrylimide.

8. The composition of claim 2, wherein the aminimide compound is 1,1-dimethyl-1-(2'-hydroxy-3'-phenyloxypropyl)-aminemethacrylimide.

9. The composition of claim 2, wherein the aminimide compound is 1,1-dimethyl-1-(2'-hydroxyethyl)-aminemethacrylimide.

10. The composition of claim 2, wherein the aminimide compound is bis-[1,1-dimethyl-1-(2'-hydroxypropyl)-amine]-adipinimide.

11. The composition of claim 2, wherein the aminimide compound is 1,1-dimethyl-1-(2'-hydroxypropyl)-aminepropylimide.

12. The composition of claim 2, wherein the aminimide compound is 1,1-dimethyl-1-(2'-hydroxypropyl)-aminebenzimide.

13. The composition of claim 2, wherein the aminimide compound is bis-(trimethylamine)-phthalimide.

14. The composition of claim 2, wherein the aminimide compound is 1,1-dimethyl-1-(2'-hydroxy-3'-phenoxypropyl)-aminebenzimide.

15. The composition of claim 2, wherein the aminimide compound is 1,1-dimethyl-1-(2'-hydroxy-2'-phenylethyl)-aminebenzimide.

16. The composition of claim 2, wherein the aminimide compounds is 1,1-dimethyl-1-(2'-hydroxy-2'-allyloxypropyl)-aminebenzimide.

17. The composition of claim 2, wherein the aminimide compound is 1,1-dimethyl-1-(2'-hydroxy-2'-butoxypropyl)-aminebenzimide.

18. The composition of claim 2, wherein the aminimide compound is 1,1-dimethyl-1-(2'-hydroxy-3'-phenoxypropyl)-aminepropionimide.

19. The composition of claim 2, wherein the aminimide compound is 1,1-dimethyl-1-(2'-hydroxy-2'-phenylethyl)-aminepropionimide.

20. The composition of claim 2, wherein the aminimide compound is 1,1-dimethyl-1-(2'-hydroxy-3'-allyloxypropyl)-aminepropionimide.

21. The composition of claim 2, wherein the aminimide compound is 1,1-dimethyl-1-(2'-hydroxy-3'-butoxypropyl)-aminepropionimide.

22. The composition of claim 1, wherein said composition contains the aminimide compound in an amount of 0.1 to 6 parts per 100 parts by weight of the epoxy resin.

* * * * *